Aug. 4, 1970  D. J. FROST  3,522,884
COOLANT FILTER
Filed Nov. 21, 1968
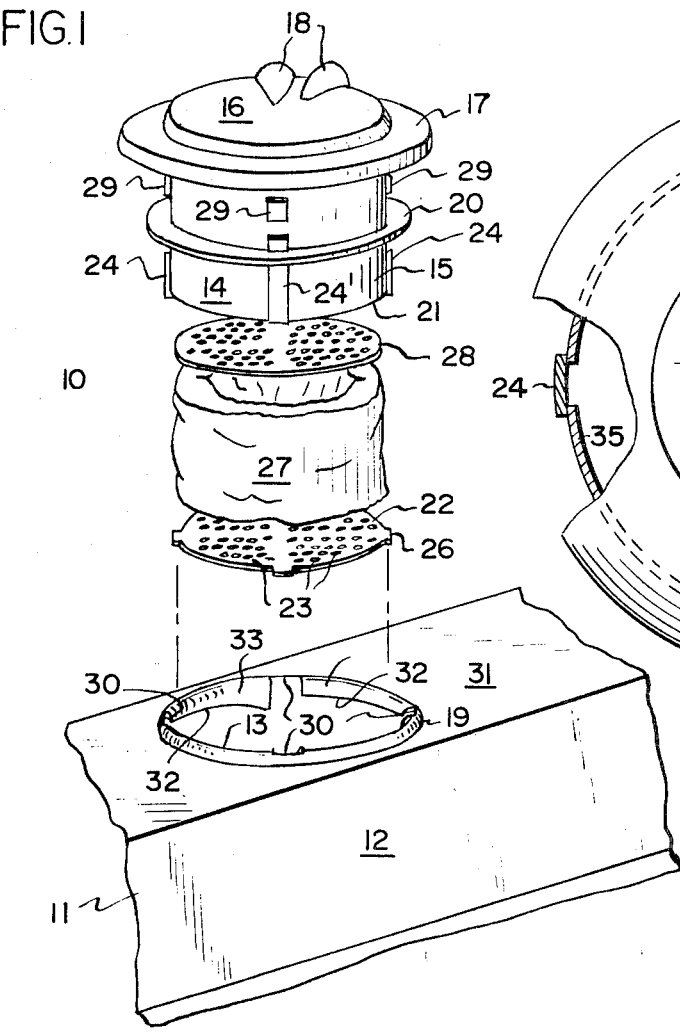
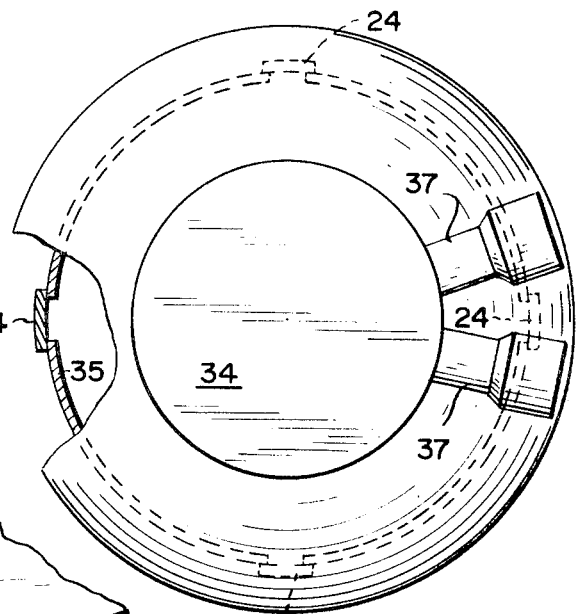
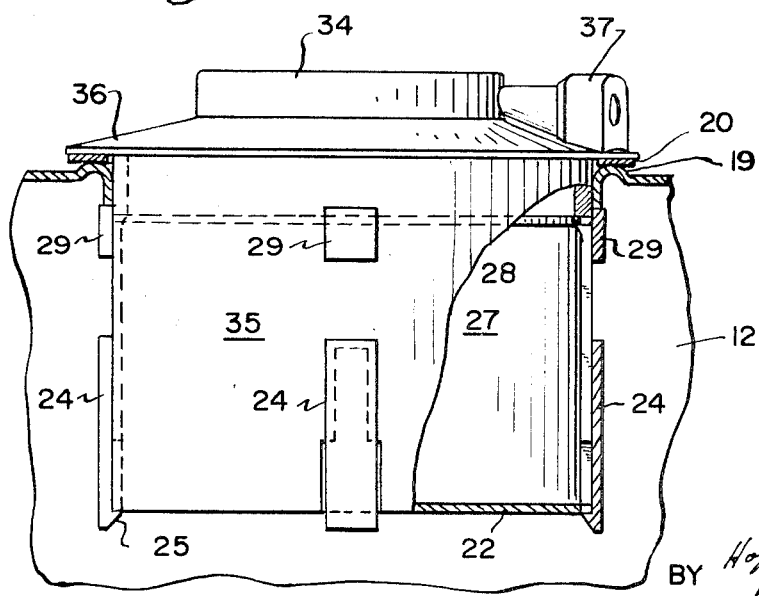
INVENTOR.
DONALD J. FROST
BY Hofgren, Wegner, Allen,
Stellman & McCord.
ATTORNEYS.

United States Patent Office 3,522,884
Patented Aug. 4, 1970

3,522,884
COOLANT FILTER
Donald J. Frost, Racine, Wis., assignor to Modine
Manufacturing Company, a corporation of Wisconsin
Filed Nov. 21, 1968, Ser. No. 777,605
Int. Cl. B01d 35/28
U.S. Cl. 210—232                         6 Claims

ABSTRACT OF THE DISCLOSURE

A coolant filter for a radiator having a coolant tank comprising a canister held in an opening in the tank and extending inwardly thereof when in use in which the canister is of one-pieces construction with integral sides and a closed end externally of the opening provided with an external flange surrounding the opening, a replaceable filter element in the canister and fluid conduits on the canister closed end for conveying coolant to the tank through the canister and the filter element.

---

One of the features of this invention is to provide a coolant filter of the above type which is of simple and inexpensive construction and with many of the parts being integral with the canister itself with the result that the filter may be made disposable if desired. Other features and advantages of the invention will be apparent from the following description of certain embodiments thereof taken in conjunction with the accompanying drawings. Of the drawings:

FIG. 1 is an exploded perspective view of a coolant filter embodying the invention and a portion of the upper tank of a radiator with which the filter is removably associated.

FIG. 2 is a side elevational view partially in section illustrating a second embodiment of the invention.

FIG. 3 is a plan view partially in section of the embodiment of FIG. 1.

As shown in the embodiment of FIG. 1 the filter 10 is adapted to be associated with a radiator 11 and particularly the top tank 12 (or a surge tank) of the radiator. This radiator is the ordinary internal combustion engine type that has a top tank as shown and a bottom tank with interconnecting tubes that are not shown. This tank 11 is provided with an opening 13 that is adapted to receive the filter in the manner illustrated in the embodiment of FIG. 2.

The filter comprises a canister 14 that is of one-piece construction with integral cylindrical sides 15 in the shape of a cylinder and a closed outer end 16 provided with an external annular flange 17 that forms a part of the outer end 16. This closed end 16 carries a pair of bosses 18 to which coolant tubes (not shown) may be connected for conveying coolant from the engine (not shown) through the filter and into the radiator tank 12.

The portion 19 of the tank 12 surrounding the opening 13 is rounded at the top and is adapted to be engaged by an annular gasket 20 normally located between this surface portion 19 and the flange 17 to form a fluid tight seal.

The canister 14 has an open inner end 21 that is normally located within the tank 12 when the filter is in position. This open inner end is provided with a removable closure plate 22 that has fluid flow means therein in the form of a plurality of holes 23. This closure plate 22 is held in position by releasable retaining means, here illustrated as a plurality of spring fingers 24 on the outer surface of the canister 14. Each spring finger has an inwardly hooked inner end 25 as shown most clearly in the FIG. 2 embodiment adapted to engage beneath the similarly spaced peripheral projections 26 on the closure plate 22. In the second embodiment there are four of these spring fingers 24 and four projections 26 to be engaged thereby.

The closure plate 22 when in position as described retains within the canister 14 a filter member 27 of the customary construction, the one shown being of closed porous fabric construction. The top end of this filter member 27 bears against a top perforated plate 28 that is similar in construction to the bottom closure plate 22 except omitting the peripheral projections.

The filter 10 is releasably locked in position in the opening 13 by cam locking means on the canister 14 and the tank 12. This cam locking means comprises a plurality of spaced lugs 29, here shown as four, projecting outwardly from the outer surface of the canister 14. These lugs 29 pass through similarly spaced notches 30 in the upper surace 31 of the tank 12 and engage inclined cam surfaces 32 to lock the filter in position. These cam surfaces 32 in the embodiments shown are formed by the inner edges of inwardly projecting flanges 33 that extend inwardly with respect to the tank opening 13 in the interior of the tank 12.

The embodiment of FIGS. 2 and 3 is very similar to that of FIG. 1 and where the elements are the same the numerals in the second embodiment are the same as those in the first embodiment. In this second embodiment substantially the only differences are that the outer end 34 of the canister 35 and the annular flange 36 as well as the bosses 37 are of somewhat different shape than the outer end 16, canister 14, flange 17 and bosses 18 of the FIG. 1 embodiment.

The coolant filter of this invention is of quite simple and inexpensive construction so that it can be embodied in a throw-away unit if desired. This filter eliminates numerous bolts, lockwashers, tapping bosses and the like of prior filters and also uses the more effective and less expensive flat sealing gasket 20 in place of the customary O-ring. Many of the parts of the filter are associated in a one-piece construction, as pointed out in the above description of the two embodiments, which further simplifies manufacture and reduces the chances of failure.

Having described my invention as related to the embodiments shown in the accompanying drawings, it is my intention that the invention be not limited by any of the details of description, unless otherwise specified.

I claim:

1. A coolant filter for a radiator having a coolant tank, comprising: a canister held in an opening in said tank and extending into said tank when in use, the canister and said opening being considerably smaller in area than said tank so as to occupy only a small portion of the available tank area, said canister being of one-piece construction with integral sides and a closed end externally of said opening provided with an external flange surrounding said opening, a replaceable filter element in said canister, fluid conduit means on said canister closed end for conveying coolant to said tank through said canister and filter element, said canister having an open inner end within the tank, a closure for said inner end having fluid flow means therethrough, and retaining means on said canister for releasably retaining said closure across said inner end for removal of said closure in replacing a used filter element.

2. The filter of claim 1 wherein said retaining means comprises a plurality of spring fingers engaging said closure.

3. A coolant filter for a radiator having a coolant tank, comprising: a canister held in an opening in said tank and extending into said tank when in use, the canister and said opening being considerably smaller in area than said tank so as to occupy only a small portion of the available tank area, said canister being of one-piece construction with integral sides and a closed end externally of said opening provided with an external flange surrounding said opening, a replaceable filter element in said canister, fluid conduit means on said canister closed end for conveying coolant to said tank through said canister and filter element, and cam locking means on said canister and tank for releasably retaining said canister in said opening, said cam locking means comprising a plurality of lugs integral with said canister and engaging cam surfaces on the portion of the tank surrounding said opening.

4. The filter of claim 3 wherein said portion of the tank surrounding said opening is provided with flanges extending inwardly with respect to said opening and having inner portions comprising said cam surfaces.

5. A coolant filter for a radiator having a coolant tank, comprising: a canister held in an opening in said tank and extending into said tank when in use, the canister and said opening being considerably smaller in area than said tank so as to occupy only a small portion of the available tank area, said canister being of one-piece construction with integral sides and a closed end externally of said opening provided with an external flange surrounding said opening, a replaceable filter element in said canister, fluid conduit means on said canister closed end for conveying coolant to said tank through said canister and filter element, said canister having an open inner end within the tank and there are provided a closure for said inner end having fluid flow means therethrough, retaining means on said canister for retaining said closure across said inner end, and wherein the outer surface of said tank beneath said flange is substantially rounded and there is provided an annular flat gasket thereon sealing the canister to said surface, and cam locking means on said canister and tank for releasably retaining said canister in said opening.

6. The filter of claim 5 wherein said cam locking means comprises a plurality of lugs integral with said canister and engaging cam surfaces on the portion of the tank surrounding said opening, and said portion of the tank surrounding said opening is provided with flanges extending inwardly with respect to said opening and having inner portions comprising said cam surfaces.

References Cited

UNITED STATES PATENTS

| 1,554,924 | 9/1925 | Shapiro | 210—167 X |
| 1,595,147 | 8/1926 | Fox | 123—41.55 X |
| 3,358,839 | 12/1967 | Simons | 210—232 |
| 3,443,264 | 5/1969 | Miller | 210—169 X |

FOREIGN PATENTS 917,499 1/1947 France.

REUBEN FRIEDMAN, Primary Examiner

T. A. GRANGER, Assistant Examiner